March 2, 1954     J. VAN ACKEREN     2,671,011
AMMONIUM SULFATE CRYSTAL PRODUCING APPARATUS
Filed Sept. 29, 1948     2 Sheets-Sheet 1
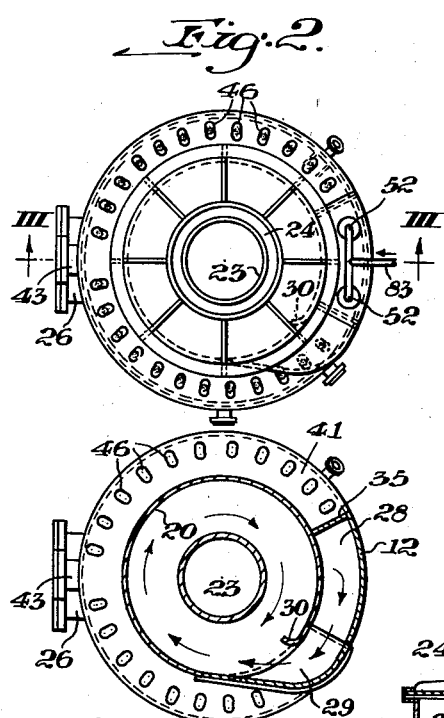
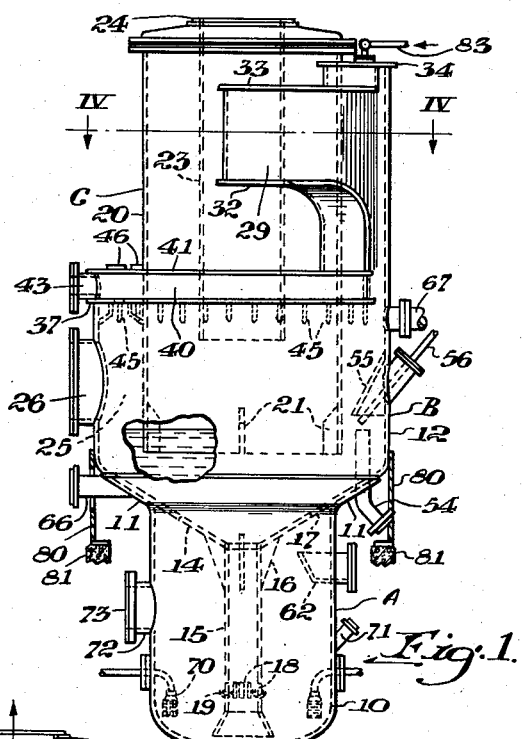
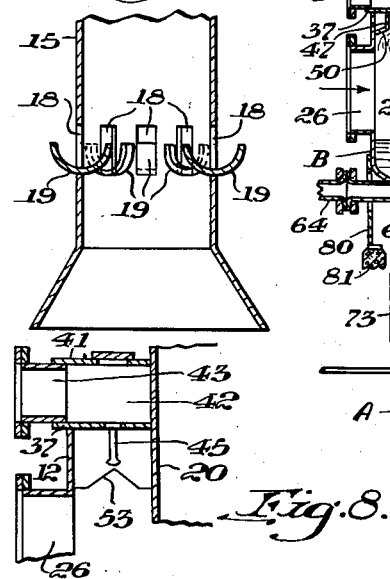
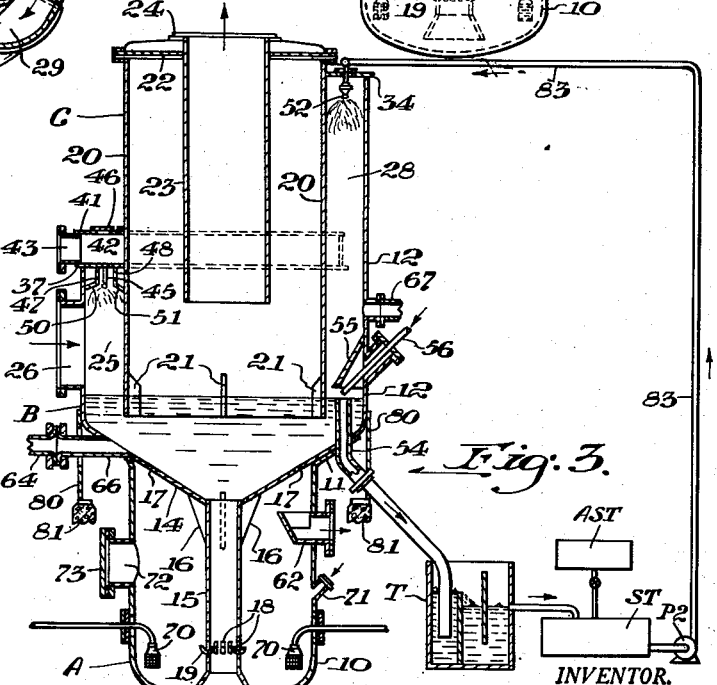
INVENTOR.
JOSEPH VAN ACKEREN.
BY
his ATTORNEY.

March 2, 1954  J. VAN ACKEREN  2,671,011
AMMONIUM SULFATE CRYSTAL PRODUCING APPARATUS
Filed Sept. 29, 1948  2 Sheets-Sheet 2

INVENTOR.
JOSEPH VAN ACKEREN.
BY Arthur L. Jerome
his ATTORNEY.

Patented Mar. 2, 1954

2,671,011

UNITED STATES PATENT OFFICE 2,671,011

AMMONIUM SULFATE CRYSTAL PRODUCING APPARATUS

Joseph van Ackeren, Pittsburgh, Pa., assignor to Koppers Co., Inc., Pittsburgh, Pa., a corporation of Delaware Application September 29, 1948, Serial No. 51,724

6 Claims. (Cl. 23—273)

This invention relates to improved apparatus and to an improved method for treating gases, such as coke oven gas, to remove ammonia and similar constituents therefrom.

It is customary in the art to recover the ammonia in coke oven gas by passing the gas through a saturator containing a weak sulfuric acid solution through which the gas is bubbled with the result that the ammonia in the gas, and the sulfate radical in the acid solution, combine to form sulfate of ammonia which crystallizes out of the acid solution.

In order to obtain substantially complete removal of the ammonia from a gaseous mixture, it is necessary not only for all of the gas to come into contact with the sulfuric acid bath, but to come into contact with an acidic portion of the bath capable of reacting with ammonia. To secure adequate and effective contact between the gas and the liquid of the sulfuric acid bath, it has been customary to introduce the gas into the liquid of the bath at a point a substantial distance below the surface of the liquid and permit the gas to bubble upwardly through the liquid. An inherent disadvantage of this arrangement is the relatively high pressure required to force the gas below the surface of the liquid, and the relatively high cost of operating the compressors or blowers for developing this pressure.

In the processes heretofore employed the gas leaving the saturator carries with it particles of acid, and it has been customary to provide, as a separate piece of apparatus, an acid separator for removing the acid from the gas leaving the saturator and returning this acid to the saturator.

An object of this invention is to provide an improved method and apparatus of the type described which eliminates the necessity for maintaining such pressure on the gaseous mixture as is required when it is introduced into the acid bath in the saturator at a point below the level of the surface of the bath.

Another object of the invention is to provide an improved method and apparatus of the type described which eliminates the necessity for an acid separator as a separate piece of equipment.

A further object of the invention is to provide an improved saturator which incorporates therein an acid separator.

Another object of the invention is to provide an improved saturator in which there is no liquid seal to create back pressure to oppose the flow of the gaseous mixture through the saturator (i. e. the flow of gas is unobstructed in the sense that there is no head of liquid opposing its flow).

A further object of the invention is to provide an improved saturator in which the gaseous mixture is passed through an acid spray, and in which the direction of flow of the gaseous mixture is continuously altered to thereby create turbulence and insure intimate and complete admixture of the gas and of the acid as the gas passes through the acid spray.

Another object of the invention is to provide an improved saturator of the type described and in which a structural element, which is a part of the duct forming a torturous path for the gas entering the saturator, is also a part of the cyclone separator for removing acid from the gas leaving the saturator.

A further object of the invention is to provide an improved saturator of the type described which is arranged so that a large volume of liquid may be circulated with a minimum of expense for pumping.

Another object of the invention is to provide an improved saturator of the type described which is arranged so that the vertical distance through which liquid of the acid bath must be elevated is kept at the minimum to thereby reduce the expense of pumping the liquid.

A further object of the invention is to provide an improved saturator of the type described which incorporates means for insuring efficient and substantially complete removal of the pyridine and related constituents from the gas passing through the saturator.

Another object of the invention is to provide an improved saturator of the type described which is arranged to insure the production of ammonium sulfate crystals of controllable size.

A further object of the invention is to provide a saturator incorporating improved means for insuring that movement of supersaturated solution upward through a bed of crystals in the saturator will be at a substantially uniform rate throughout the entire area of the crystal bed.

Other objects of the invention and features of novelty will be apparent from the following description taken in connection with the accompanying drawings in which:

Fig. 1 is a side elevation of my improved saturator, with a part broken away to show the interior construction;

Fig. 2 is a top or plan view of the saturator shown in Fig. 1;

Fig. 3 is a sectional view of the saturator and its associated apparatus taken on the line III—III of Fig. 2;

Fig. 4 is a sectional view taken on the line IV—IV of Fig. 1;

Fig. 5 is a fragmentary enlarged view of the lower end of the slurry-circulating pipe and showing the slurry deflectors and by-pass passages;

Fig. 8 is a fragmentary enlarged sectional view showing a modification which I may employ.

Figure 6:
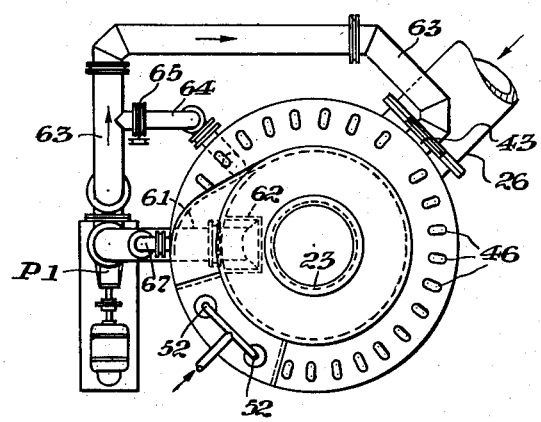
Fig. 6 is a top view of the saturator together with the associated piping and liquor-circulating pump.
Figure 7:
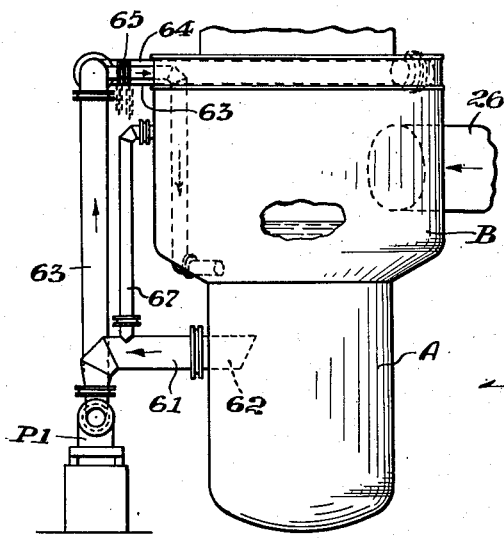
Fig. 7 is a fragmentary elevational view showing the lower portion of the saturator and the associated piping, with the supporting skirt omitted.

In Figs. 6 and 7 of the drawings, in order to more clearly illustrate the arrangement of the apparatus, some of the pipe connections to the saturator are shown in somewhat different rotative positions than they are shown in the other figures of the drawings.

Referring to the drawings, it will be seen that the saturator is generally cylindrical in form, and has a lower, or crystallizing bath-containing portion A, a central or absorbing portion B, and an upper or acid-separator hood portion C.

The saturator is preferably constructed of sheet stainless steel of a type which is resistant to the action of acid of the concentrations customarily employed. The various individual sections are welded together with suitable stainless steel welding rod to provide a gas and liquid tight structure, and the welded areas are thereafter ground and polished to present smooth surfaces which offer little opportunity for the adherence of crystals. Hence, the tendency for salt incrustations to develop in the saturator is held to the minimum.

The lower or bath-containing portion A of the saturator is a substantially cylindrical sheet metal bowl 10 which is closed at the bottom by a curved head. The upper edge of this bowl flares radially outwardly, as indicated at 11, and is secured to the lower face of the bottom wall of the central or absorber portion B of the saturator.

The central or absorber portion B of the saturator is a vessel having a cylindrical outer wall 12 which is of somewhat larger diameter than the lower portion A of the saturator. The outer wall 12 is secured to a conical, dished head 14, the surface of which slopes downwardly to a central slurry circulating pipe 15 of relatively large diameter.

A plurality of angular braces, or reinforcing members 16, are secured to the outer surface of the pipe 15 and to the bottom surface of the head 14 of the absorber portion B to accurately and rigidly secure the pipe 15 to the head 14.

A plurality of holes 17 in the head 14 near the point of attachment of the bowl 10 with the head 14 prevent entrapment of gas in the upper part of the crystallizing portion of the saturator. The holes 17 are of such size, and their flow capacity is so limited, that the preferred hereinafter-described circulation of acid solution throughout the saturator is not materially affected by flow of solution through these holes.

The pipe 15 is of such length, as is clearly shown in Figs. 1 and 3, as to extend to a point a short distance above the bottom of the lower or crystallizing bath-containing portion A. The lower end of the pipe 15 is flared or enlarged somewhat to reduce the rate of flow of liquid in this portion of the pipe. In addition, as is best shown in Fig. 5, the lower end of the pipe has a plurality of rectangular openings 18 therein, and a curved deflector 19 is secured in each of these openings.

As hereinafter explained, a portion of the liquid flowing downwardly in the pipe 15 is diverted by the deflectors 19 through the openings 18 and thence upwardly in the crystallizer bowl.

The upper or acid-separator hood portion C includes a substantially cylindrical member 20 of somewhat smaller diameter than the wall 12 of the absorber portion B of the saturator. The member 20 is located centrally or coaxially of the wall 12 of the absorber portion, and, as is best shown in Fig. 3, the member 20 extends downwardly within the wall 12 to a point a short distance above the head or lower wall 14 of the absorber portion B. The lower end of the cylindrical member 20 is open, while a plurality of inwardly extending ribs 21 are secured on the inner face of the member 20 and prevent swirling or circular motion of the liquid in the saturator.

The upper end of the cylindrical member 20 is closed by a head 22 through which extends a centrally located pipe 23, Fig. 3, of relatively large diameter. The pipe 23 extends downwardly from the head 22 a substantial distance, the lower end of the pipe 23 being open and being located some distance above the lower edge of the member 20. The upper end of the pipe 23 is surrounded by a flange 24 and serves as the outlet for gas leaving the saturator.

As explained above, the cylindrical hood member 20 and the cylindrical wall 12 are substantially concentric, and the member 20 extends within the wall 12. Hence, an arcuate or curved channel passageway or absorption chamber 25 is formed between the members 12 and 20, the outer wall of the chamber being formed by the wall 12, and the inner wall of the chamber being formed by the member 20.

As can be seen from the above description and from the drawings, passageway or chamber 25 defines a relatively narrow elongated absorption chamber or zone whose use and operation are described more fully below.

The wall 12, together with the lower wall or head 14, form a vessel which is adapted to hold a body of solution, and the cylindrical member 20, together with the head 22, form an inverted vessel which helps to close the top of the absorber portion B as well as to function as an acid separator. The member 20 and the associated elements may also be considered as a conduit through which gas leaving the saturator passes.

A relatively large opening 26, Fig. 1, is provided in the wall 12 and serves as an inlet for the flow of gas into the channel absorption chamber 25 and thus into the saturator.

A portion of the chamber 25 diametrically opposite from the inlet opening 26 communicates with a vertically extending passage 28, Figs. 3 and 4, the inner wall of which is formed by the cylindrical member 20 and the outer wall of which is formed by an upward extension of the wall 12. Hence, the radial extent of the passage 28 is the same as the chamber 25, while the circumferential extent of the passage 28 is such that the cross-sectional area of this passage is approximately the same as that of the inlet opening 26.

The upper end of the vertical passage 28 communicates with a horizontal passage 29, Figs. 1 and 4, which extends a portion of the distance around the cylindrical member 20. As is best shown in Fig. 4, the cylindrical member 20 has an opening therein into which the passage 29 connects, the outer wall of the passage 29 being curved adjacent the vertical passage 28 and gradually merging into a substantially straight portion which is tangent to the cylindrical member 20. The portion of the cylindrical member 20 on the side of the opening in this member adjacent the vertical passage 28 is curved inward slightly, as indicated at 30.

The lower wall of the horizontal passage 29 is formed by a curved plate 32, Fig. 1, which also forms one side wall of the vertical passage 28. The upper wall of the horizontal passage 29 is formed by a plate 33, one end of which curves upwardly and is joined to a plate 34, which closes the upper end of the vertical passage 28. The other side wall of the vertical passage 28 is formed by a plate 35, Fig. 4.

The upper face of the chamber 25 is closed by an arcuate plate 37, Fig. 3, which extends circumferentially around the saturator from the plate 35 at one side of the vertical passage 28 to the plate 32 at the other side of the passage 28. The inner edge of the plate 37 is secured to the outer face of the cylindrical member 20, while the outer edge of the plate 37 is secured to the top of the wall 12.

A curved plate 40, Figs. 1 and 2, is secured on the upper face of the plate 37 near its outer edge and extends around the saturator from the plate 32 on one side of the vertical passage 28 to the plate 35 on the other side of the vertical passage 28.

An arcuate plate 41, Figs. 1, 2, 3, and 4, is secured to the upper edge of the plate 40 and extends to and is secured to the outer face of the cylindrical member 20. The plate 41 extends around the saturator from the plate 32 at one side of the vertical passage 28 to the plate 35 at the other side of this passage.

The plates 37, 40 and 41 and the cylindrical member 20 cooperate to form an arcuate duct 42, Figs. 3 and 4, extending around the saturator except where the vertical passage 28 is located. An inlet 43 to the duct 42 is provided at a point substantially opposite the vertical passage 28 so that the nearly semi-circular portions of the duct on opposite sides of the inlet 43 are substantially equal in length.

A plurality of downwardly directed nozzles 45, Figs. 1 and 3, are secured in the plate 37 and are located substantially intermediate the walls 12 and 20 so that the spray from the nozzles fills the channel absorption chamber 25. The nozzles 45 may be secured in the plate 37 in any desired manner, while the plate 41 has openings therein directly above the nozzles 45 to permit ready access to the nozzles. The openings in the plate 41 are closed by suitable cover plates 46, Figs. 1, 2, 3 and 4. The duct 42 forms a manifold or header for supplying acid solution to the nozzles 45.

The nozzles 45 extend downwardly from the plate 37 a substantial distance, and means is provided to prevent circulation of gas in the portion of the chamber 25 above the tips of the nozzles. As shown in Fig. 3, plates 47 and 48 extend downwardly from the plate 37 on opposite sides of the nozzles 45. The plates 47 and 48 are located relatively near the nozzles 45 so there is little space for flow of gas between these plates and the nozzles.

The plates 47 and 48 are curved, as viewed from the top of the saturator, and extend throughout the chamber 25. A conical plate 50 extends from the plate 47 to member 12, while a similar plate 51 extends from the plate 48 to the cylindrical member 20. The plates 47, 48, 50 and 51, therefore, enclose the area above the tips of the nozzles 45 and substantially exclude gas from flowing in the region above the spray from the nozzles. This prevents gas from passing through the saturator without being exposed to spray of solution from the nozzles, and it inhibits accumulation of salt on the surfaces above the nozzles.

In Fig. 8 of the drawings there is shown a different arrangement for preventing flow of gas in the area above the tips of the nozzles. In this modification a plurality of radially extending plates 53 are provided. These plates extend from the outer face of the cylindrical member 20 to the inner face of the wall 12, and the upper edge of each of these plates is secured to the lower face of the plate 37. The lower side of each of the plates 53 has therein a centrally located triangular notch which is of such size and location that the spray from adjacent nozzles 45 fills the area of the notch. The plates 53 effectively prevent flow of gas in the area above the spray from the nozzles 45, and insure that all of the gas flowing through the chamber 25 comes into contact with spray from the nozzles 45.

Two nozzles 52, Figs. 2, 3 and 6, are mounted in the top plate 34 at the upper end of the passage 28. The nozzles 52 spray liquid into the gas as it passes upwardly in the passage 28. As hereinafter explained, the liquid for the nozzles 52 is preferably supplied from a different source than the liquid supplied to the nozzles 45.

This saturator includes a liquid level control means for maintaining the liquid in the saturator at a selected level. As illustrated this liquid level control means comprises an overflow pipe 54, Fig. 3, which projects through the wall 14 and extends upwardly to a point a substantial distance, such as 10 inches, above the bottom of the cylindrical member 20. The overflow pipe 54 determines the level of the liquid in the saturator and this is fixed at a selected level high enough above the bottom of the member 20 to prevent gas from the chamber 25 from flowing under the bottom of the cylindrical member 20 and thence to the outlet pipe 23 without passing through the vertical passage 28, and through the separator portion of the saturator. The overflow pipe 54 communicates with the usual tar-skimmer tank T.

A hood 55, Fig. 3, is secured to the inner face of the wall 12 and covers the opening into the pipe 54 so that spray from the nozzles 45 and 52 will not flow directly into the overflow pipe 54. The upper edge of the hood 55 is secured to the wall 12 while the lower edge of the hood extends inwardly beyond the pipe 54, and a short distance, such as 4 inches, above the pipe 54. The hood 55 extends at a relatively steep angle so liquid will flow off it rapidly and thus prevent the deposit of crystals on this member.

A pipe 56, Figs. 3 and 4, communicates with the interior of the saturator at a point beneath the hood 55. The pipe 56 may be employed to spray hot water on the overflow pipe 54 and thus prevent clogging of this pipe by tar which is carried into the saturator by the gas.

The saturator has associated therewith a pump for circulating liquor in the lower or bath-containing portion of the saturator and for supplying liquor to the nozzles 45. Referring to Figs. 6 and 7, it will be seen that a motor driven pump P1 is provided and that the inlet of this pump communicates with the lower or bath-containing portion A of the saturator by a pipe 61. The pipe 61 opens into the lower portion A of the saturator through a suction head 62, which is a substantially rectangular bowl-shaped member, which is open only at the top. The side walls of the member 62 flare outwardly, as shown in Fig. 6, so that the opening into the suction head is of relatively large area with the result that the velocity of the liquid flowing into the suction head is correspondingly low. The upper edge of the side walls of the suction head 62 is in substantially the same horizontal plane throughout the periphery of this member so that the flow of liquid into the suction head is at a substantially uniform rate at all points. As is obvious in Figs. 1 and 3 of the drawings, the suction head 62 is located near the top of the lower portion A of the saturator.

The pump P1 supplies liquid through a pipe 63 to the duct 42, Fig. 3, and thus to the nozzles 45. The duct 42, therefore, serves as a manifold or header for supplying liquid to the nozzles 45. A branch pipe 64, Figs. 6 and 7, governed by a valve 65, leads from the pipe 63 to a connection 66 which opens into the saturator at a point below the level of the liquid in the saturator. The by-pass pipe 64 and the valve 65 enable the circulation of liquid in the saturator to be increased by a variable amount in excess of that provided by the flow of liquid through the nozzles 45.

A pipe 67, Fig. 7, connects to the inlet pipe 61 at a point between the pump P1 and the saturator and leads to the interior of the saturator at a point above the level of the liquid in the saturator. The pipe 67 is a vent and provides means for the escape of gases from the inlet pipe 61.

Suction heads 70, Figs. 1 and 3, of conventional construction, extend into the lower portion of the bowl 10 and provide means for withdrawing ammonium sulfate crystals from the saturator and for supplying the sulfate to a centrifugal dryer, not shown. Liquid removed from the crystals in the dryer is returned to the saturator through the pipe connection 71.

A relatively large opening 72, Figs. 1 and 3, is provided in the bowl 10 and is closed by a cover 73. This opening enables workmen to secure access to the interior of the lower portion of the saturator during its construction, or for maintenance purposes, after it has been in use.

A skirt 80, Figs. 1 and 3, surrounds the saturator and is secured to the exterior of the member 12. The skirt 80 extends downwardly and rests upon suitable supporting means, such as the reinforced concrete abutments 81, to provide a support for the saturator.

Liquid from the tar tank T overflows into a storage tank ST, from which it is pumped by a suitable pump P2 to a pipe 83, Figs. 1, 2 and 3, and thus to the nozzles 52. Make-up acid from an acid storage tank AST is also supplied to the storage tank ST, and thus is supplied through pipe 83 to the nozzles 52. The amount of make-up acid supplied from the acid storage tank AST to the tank ST is regulated so that the liquid discharged from the nozzles 52 has an acid content about twice as high as the liquid in the saturator bath, that is, about 11% acid in the spray from the nozzles 52, as compared to about 5½% acid in the saturator bath.

Make-up acid, in addition to that supplied through the nozzles 52, may be supplied to the saturator in any desired manner.

Under normal operating conditions the bath level in the saturator is maintained approximately constant by the overflow pipe 54, while liquid is withdrawn from the upper part of the bowl 10 by the pump P1 through the suction head 62, and is supplied to the header or manifold 42 from which it flows through the nozzles 45 and is sprayed throughout the absorption chamber 25 and falls to the surface of the bath at the bottom of this chamber. In addition, liquid supplied by pump P1 through the by-pass pipe 64 is added to the bath at the bottom of chamber 25.

Similarly, the liquid discharged from the nozzles 52 at the upper end of the vertical passage 28 is sprayed throughout the passage 28 and falls to the surface of the liquid in the saturator.

Likewise, liquid which collects on the interior of the wall 20 of the acid-separator portion C of the saturator flows down this wall and adds to the liquor in the saturator bath. It will be seen that the arrangement for the return of liquid from the acid-separator to the saturator bath is such that it is unnecessary for this liquid to flow through small pipes which may become clogged by salt deposits. The incorporation of the acid separator in the saturator, therefore, eliminates a troublesome operating difficulty which exists when the acid separator is an independent unit.

The liquid in the portion of the saturator above the header or division wall 14 flows downwardly through the pipe 15 to the lower or bath-containing portion of the saturator to replace the liquid removed by the pump P1.

Coke oven, or other gas to be processed, is supplied to the saturator through the inlet opening 26, Fig. 1 and 3, to the chamber 25 and the vertical passage 28. The vertical passage 28 is diametrically opposite the inlet opening 26 while the channel 25 which is located radially outwardly of the cylinder member 20 provides two paths in multiple through which gas may flow from the inlet opening 26 to the vertical passage 28. As viewed in Figures 2 and 3 of the drawings one of the channels extends from the inlet opening 26 in a clockwise direction around the member 20, while the other channel extends from the inlet opening 26 in a counterclockwise direction around the member 20. Both of these channels communicate with the lower end of the passage 28.

As the gas passes through the chamber 25, it must pass through spray from the nozzles 45 which, as can be seen from the drawing are uniformly distributed over the entire length of absorption zones 25. This spray is extremely dense and completely fills the chamber 25. The rate of flow of gas through the chamber 25 is relatively high so that the gas is extremely turbulent. Furthermore, because of the curvature of the two portions of the chamber 25 through which the gas flows, the gas in flowing through these portions is constantly changing direction and there is no laminar flow of gas or stratification of the gas. Due to the extended gas-liquid interface existing in the mixture of spray and gas, the absorption of ammonia proceeds rapidly to completion and by the time the gas reaches the vertical passage 28, it is substantially free of ammonia. The turbulent flow of gas through the channels 25 is also very effective in bringing the gas into contact with the acid absorbing liquid which forms the bottom walls of the channels.

As just explained, the gas supplied through the inlet passage 26 divides into two streams flowing horizontally in curvilinear paths, one of which flows in one direction through a substantially semi-circular portion of chamber 25 while the other gas stream flows through the other portion of the chamber 25. Hence, there are two arcuate paths in multiple between the inlet opening 26 and the vertical passage 28, and each of these paths is required to handle only one-half of the gas. Hence, each path can be of smaller cross-sectional area than would be necessary if each path was required to handle the entire volume of gas. As a result, the chamber 25 may be made of substantially smaller size and of lesser vertical extent than would otherwise be required. The reduced vertical extent of the chamber 25 reduces the vertical distance through which liquid must be pumped to the nozzles 45, so the pumping cost is reduced to the minimum.

The gas streams flowing through the two portions of the chamber 25 in multiple meet at the base of the vertical passage 28 and flow upwardly through this passage in countercurrent to the liquid sprayed from the nozzles 52 at the top of this passage.

As previously explained, the liquid sprayed from the nozzles 52 has a substantially higher acid content than that supplied from the nozzles 45. This liquid of high acid content has a greater affinity for pyridine and its congeners than the liquid of low acid content, and, therefore, removes the gas passing through the vertical passage 28, any of these constituents not removed by passage of the gas through the chamber 25.

The liquid from the nozzles 52, together with the pyridine and other constituents absorbed thereby, adds to the bath in the saturator and increases the pyridine concentration of this bath. The pyridine may be removed from the bath by any suitable means well known in the art so as to maintain the pyridine concentration of the saturator bath at a satisfactorily low level to thereby make possible substantially complete recovery of the pyridine.

When the gas reaches the upper part of the vertical passage 28, the gas flows through the horizontal passage 29 and is discharged tangentially into the chamber within the member 20 and outside the pipe 23.

The gas discharged from the passage 29 is flowing at high velocity and when discharged tangentially into the chamber within the member 20, the gas flows around and around within the hood member 20 at high speed so that entrained liquid carried by the gas is thrown radially outwardly against the member 20 and then drains down into the saturator bath. The entrained liquid is thereby removed from the gas. The gas within the member 20 gradually flows downwardly and loses velocity, and then reverses its direction and flows upwardly into the pipe 23 and thence from the saturator, but by the time the gas reaches the pipe 23, substantially all of the free liquid is removed therefrom.

As pointed out above, the baffles 21 on the inside of the member 20 prevent the rapidly rotating gas within the member 20 from causing the liquid within the member 20 to swirl or rotate.

As explained above, the liquid sprayed from the nozzles 45 and 52 absorbs ammonia and other constituents from the gas, while this liquid is added to the portion of the saturator bath above the header 14, thereby increasing the concentration of ammonium sulfate in this portion of the bath. In addition, as explained above, due to the action of the pump P1 in removing liquid from the lower or bath-containing portion A of the saturator, liquid continuously flows from the portion of the bath above the header 14 through the pipe 15, from which the liquor is discharged near the bottom of the bowl 10. The liquid discharged from the pipe 15 then flows upwardly towards the suction head 62 where the liquid flows to the pump P1 and is recirculated. There is, therefore, a constant circulation of liquid in the saturator over the path which includes the suction head 62, the pump P1, the spray nozzles 45, and the by-pass pipe 64, thence downwardly through the pipe 15, and upwardly through the bath-containing portion of the saturator to the suction head 62. There is, therefore, a continuous upward movement of the liquid in the bowl 10, that is in the bath-containing portion A of the saturator.

The various parts of the lower or bath-containing portion A of the saturator are so arranged that the rate of flow of liquid upwardly in the bowl 10 is substantially uniform throughout the entire area of the bowl 10. The liquid discharged from the lower end of the pipe 15 impinges on the bottom of the bowl and flows radially outwardly and thence upwardly in the region adjacent the wall of the bowl 10, that is in the radially outer portion of the bowl 10. At the same time some of the liquid flowing downwardly through the pipe 15 is diverted by the deflectors 19 through the openings 18 and thence upwardly in the region adjacent the pipe 15, that is in the radially inner portion of the bowl 10. The liquid diverted through the openings 18 by the deflectors 19 not only creates an upward flow of liquid in the central portion of the bowl 10, but also prevents liquid discharged from the lower end of the pipe 15, and flowing upwardly in the outer portion of the bowl 10, from flowing downwardly in the region adjacent the pipe 15. Accordingly, there is an upward movement of liquid in all portions of the bowl 10, and the rate of movement of liquid upwardly is substantially uniform throughout the area of the bowl 10 at that level.

The solution which is sprayed through the nozzles 45 and is thus brought into contact with the ammonia-containing gas, is in a substantially saturated condition when it leaves the nozzles. This solution is brought to a supersaturated condition by absorption of ammonia from the gas.

Accordingly, the liquid discharged from the pipe 15 into the lower portion of the bowl 10 is a supersaturated solution. The supersaturation of this liquid is released (i. e. the liquid is de-supersaturated) by contact with the crystals which are in suspension in the body of liquid in the lower or bath-containing portion of the saturator, whereupon the solution is returned to the nozzles 45 and is again brought into contact with the gas so that the cycle is repeated.

The ammonium sulfate deposited on the crystals in the lower portion of the saturator causes these crystals to grow in size so they settle to the lower portion of the bowl where they are attracted by the suction heads 70.

As the rate of flow of liquid upwardly in the bowl 10 is substantially uniform throughout the entire area of the bowl 10, the crystals settling to the lower part of the bowl 10 are of substantially uniform size throughout the area of the bowl. Accordingly, a relatively large proportion of the crystals withdrawn through the suction heads 70 are of the preferred relatively large size.

Some extremely small crystals are drawn into the suction head 62 by the pump P1 and are recirculated. These are discharged from the pipe 15 into the lower portion of the bowl 10. Some of these minute crystals will be attracted to the suction heads 72 and will be included in the slurry withdrawn from the saturator. However, the amount of these crystals is relatively small and is not objectionable.

The rate of supply of ammonia-containing gas to the saturator, and the rate of circulation of the liquid through the saturator, are correlated in such manner that the concentration of ammonium salts in the liquid in the saturator does not materially exceed the concentration at which new crystals are formed in the absence of seed crystals, and preferably does not exceed that concentration at which new crystals form in the presence of seed crystals. This condition is known to those skilled in the art as being in the metastable but not in the labile region of supersaturation. This condition limits or represses the formation of new crystals and aids in the formation of relatively large crystals.

The bulk of the liquid circulated through the saturator flows through the nozzles 45 which are of fixed size. The by-pass pipe 64 and the valve 65 provide means for varying the rate of circulation of solution in the saturator so that the size of the crystals which are produced under varying operating conditions can be accurately controlled.

It will be seen that this saturator incorporates an acid separator for removing free liquid from the gas before the gas leaves the separator. In addition, it will be seen that the arrangement of the saturator is such that the structural elements employed in the acid-separator portion of the saturator also serve as part of other portions of the saturator.

As explained above, the cylindrical member 20, which forms the outer wall of the upper or acid-separator portion C of the saturator cooperates with the wall 12 of the central or absorber portion B of the saturator to form the arcuate duct or passage 25 through which the gas passes while being subjected to the spray from the nozzles 45.

The cylindrical member 20 also forms a part of the vertical passage 28, and, in addition, forms a part of the manifold or header 42 for supplying liquid to the nozzles 45. Furthermore, the separator portion C of the saturator, and comprising the member 20 and the head 22, is in effect an inverted vessel and cooperates with the parts associated with the duct 42 and the vertical passage 28 to enclose the upper portion of the saturator, thereby making it unnecessary to provide separate means for enclosing the top of the saturator.

It will be seen also that the lower end of the cylindrical member 20 is open, but that it extends below the level of the liquid in the saturator so that the liquid seals this end of the member 20. This not only makes it unnecessary to provide a bottom or head for the acid-separator portion C of the saturator, but it also provides a structure with a minimum of places for salt crystals to accumulate, while any salt which does build up will be dissolved during the "kill" due to the contact of the member 20 with the liquid of the bath. The arrangement of the saturator is such, therefore, that it forms a compact unit which requires a minimum of expensive material for its construction.

Subject matter disclosed but not claimed herein, for instance features which relate broadly to apparatus or method, are the subject matter of one or more of the following co-pending applications, Serial No. 338,367, filed February 24, 1953. Serial No. 338,368 filed February 24, 1953, and Serial No. 323,615 field December 2, 1952.

Although I have herein illustrated and described only one form of improved method and apparatus for removing ammonia and other constituents from coke oven gas, it is to be understood that various changes in the method or apparatus may be made without departing from the spirit and scope of my invention as set forth in the appended claims.

Having thus described my invention, what I claim is:

1. A closed vessel for separating a component of a gaseous mixture by adsorption in a liquid which forms crystals as a result of such adsorption comprising; a chamber adapted to contain a body of liquid in the lower portion and comprising a downwardly sloping bottom, means cooperating with said chamber to define arcuate elongated horizontal gas impermeable passageways for gas which are bounded at the bottom by said body of liquid, means for introducing and removing gas from said passageways, means for spraying liquid downwardly over the entire lengths of said passageways, a crystallizing chamber disposed below and adjacent the liquid-containing chamber, a conduit extending downwardly from the lowermost portion of the bottom of the liquid-containing chamber into the crystallizing chamber, the bottom of said conduit being in spaced relation to the bottom of the crystallizing chamber, means for deflecting liquid flowing downwardly in said conduit upwardly adjacent the outer periphery of said conduit, means for withdrawing liquid from the top portion of said crystallizing chamber and pumping it to said means for spraying liquid, and means for withdrawing crystals from the bottom portion of said crystallizing chamber.

2. A closed vessel for separating a component of a gaseous mixture by adsorption in a liquid comprising; an upper chamber comprising a first vertical cylindrical member, said member being open at the bottom, a lower chamber having a downwardly sloping bottom and comprising a second vertical cylindrical member of greater diameter than said first cylindrical member positioned in spaced overlapping relation thereto so as to define an annulus therewith, an arcuate closure member for the top of said annulus, an overflow conduit in said lower chamber with its top spaced above the bottom of said first cylindrical member, a gas inlet to said annulus, a gas outlet from said annulus positioned at the top of said annulus diametrically opposite to said gas inlet and communicating with the interior of said first vertical cylindrical member, a plurality of downwardly directed liquid spray nozzles positioned in the upper portion of said annulus, means for removing liquid from the bottom of said lower chamber, and means for supplying liquid to said spray nozzles.

3. A closed vessel for separating a component of a gaseous mixture by adsorption in a liquid comprising; an upper chamber comprising a first vertical cylindrical member, said member being open at the bottom, a lower chamber having a downwardly sloping bottom and comprising a second vertical cylindrical member of greater diameter than said first cylindrical member positioned in spaced overlapping relation thereto so as to define an annulus therewith, an arcuate closure member for the top of said annulus, an overflow conduit in said lower chamber with its top spaced above the bottom of said first cylindrical member, a gas inlet to said anulus, a gas passageway from the top of said annulus to the interior of said first cylindrical member positioned diametrically opposite to said gas inlet, a plurality of downwardly directed liquid spray nozzles positioned in the upper portion of said annulus, means for removing entrained liquid from the gaseous mixture positioned in the upper portion of said upper chamber, means for removing liquid from the bottom of said lower chamber, and means for supplying liquid to said spray nozzles.

4. A closed vessel for separating a component of a gaseous mixture by adsorption in a liquid which forms crystals as a result of such adsorption comprising; an upper chamber comprising a first vertical cylindrical member, said member being open at the bottom, a lower liquid-containing chamber having a downwardly sloping bottom and comprising a vertical cylindrical member of greater diameter than said first cylindrical member positioned in spaced overlapping relation thereto so as to define an annulus therewith, an arcuate closure member for the top of said annulus, an overflow conduit in said lower chamber with its top spaced above the bottom of said first cylindrical member, a gas inlet to said annulus, a gas outlet from said annulus positioned at the top of said annulus diametrically opposite to said gas inlet and communicating with the interior of said first vertical cylindrical member, a plurality of downwardly directed liquid spray nozzles positioned in the upper portion of said annulus, a crystallizing chamber disposed below and adjacent the liquid-containing chamber, a conduit extending downwardly from the lowermost portion of the bottom of said liquid-containing chamber into the crystallizing chamber, the bottom of said conduit being in spaced relation to the bottom of the crystallizing chamber, means for withdrawing liquid from the top portion of said crystallizing chamber and pumping it to the spray nozzles, and means for withdrawing crystals from the bottom portion of said crystallizing chamber.

5. A closed vessel for separating a component of a gaseous mixture by adsorption in a liquid comprising; an upper chamber comprising a first vertical cylindrical member, said member being open at the bottom, a lower chamber having a downwardly sloping bottom and comprising a second vertical cylindrical member of greater diameter than said first cylindrical member positioned in spaced overlapping relation thereto so as to define an annulus therewith, a flat arcuate closure plate extending around the top of said annulus, an overflow conduit in said lower chamber with its top spaced above the bottom of said first cylindrical member, a gas inlet to said annulus, a gas outlet from said annulus positioned at the top of said annulus diametrically opposite to said gas inlet and communicating with the interior of said first cylindrical member, an arcuate liquid manifold disposed above and employing as its bottom boundary said flat arcuate closure plate, a plurality of downwardly directed liquid spray nozzles in communication with said liquid manifold and positioned in the upper portion of said annulus, means for removing liquid from the bottom of said lower chamber, and means for supplying liquid to said liquid manifold.

6. A closed vessel for separating a component of a gaseous mixture by adsorption in a liquid comprising; an upper chamber comprising a first vertical cylindrical member, said member being open at the bottom, a lower chamber having a downwardly sloping bottom and comprising a second vertical cylindrical member of greater diameter than said first cylindrical member positioned in spaced overlapping relation thereto so as to define an annulus therewith, a closure member for the top of said annulus, an overflow conduit in said lower chamber with its top spaced above the bottom of said first cylindrical member, a third vertical open ended cylindrical member of lesser diameter than said first cylindrical member positioned in the upper chamber with its bottom at a level above the top of said overflow conduit, a gas inlet to said annulus, a gas passageway from said annulus positioned at the top of said annulus diametrically opposite to said gas inlet and shaped to deliver gas tangentially to the interior of said first cylindrical member, a plurality of downwardly directed spray nozzles positioned in the upper portion of said annulus, means for removing liquid from the bottom of said lower chamber, and means for supplying liquid to said spray nozzles.

JOSEPH van ACKEREN.

References Cited in the file of this patent

UNITED STATES PATENTS

| Number | Name | Date |
|---|---|---|
| 853,517 | Osborne | May 14, 1907 |
| 1,264,263 | Brassert | Apr. 30, 1918 |
| 1,895,652 | Fisher | Jan. 31, 1932 |
| 1,936,308 | Mueller | Nov. 21, 1933 |
| 2,375,922 | Jeremiassen | May 15, 1945 |
| 2,424,205 | Otto | July 15, 1947 |
| 2,424,206 | Otto | July 15, 1947 |
| 2,439,547 | Otto | Apr. 13, 1948 |
| 2,482,683 | Tiddy | Sept. 20, 1949 |